United States Patent [19]

Lauck

[11] 4,016,338

[45] Apr. 5, 1977

[54] GALVANIC ELEMENT

[75] Inventor: Helmut Lauck, Glashutten, Germany

[73] Assignee: Varta Batterie Aktiengesellschaft, Hannover, Germany

[22] Filed: Aug. 16, 1976

[21] Appl. No.: 714,373

[30] Foreign Application Priority Data

Sept. 6, 1975 Germany ........................ 2539736

[52] U.S. Cl. .............................. 429/149; 429/194; 429/219

[51] Int. Cl.$^2$ ......................................... H01M 6/14

[58] Field of Search .......... 429/149, 194, 219, 218, 429/229

[56] References Cited

UNITED STATES PATENTS

| 2,528,891 | 11/1950 | Lawson | 429/219 X |
| 3,445,290 | 5/1969 | Elliott et al. | 429/199 |
| 3,853,627 | 12/1974 | Lehmann et al. | 429/194 X |

Primary Examiner—Anthony Skapars
Attorney, Agent, or Firm—Weiser, Stapler & Spivak

[57] ABSTRACT

The electrochemically reducible component of the positive electrode mass is silver carbonate. The cell which includes this electrode and also a light-metal negative electrode. The battery made of such cells.

9 Claims, 1 Drawing Figure

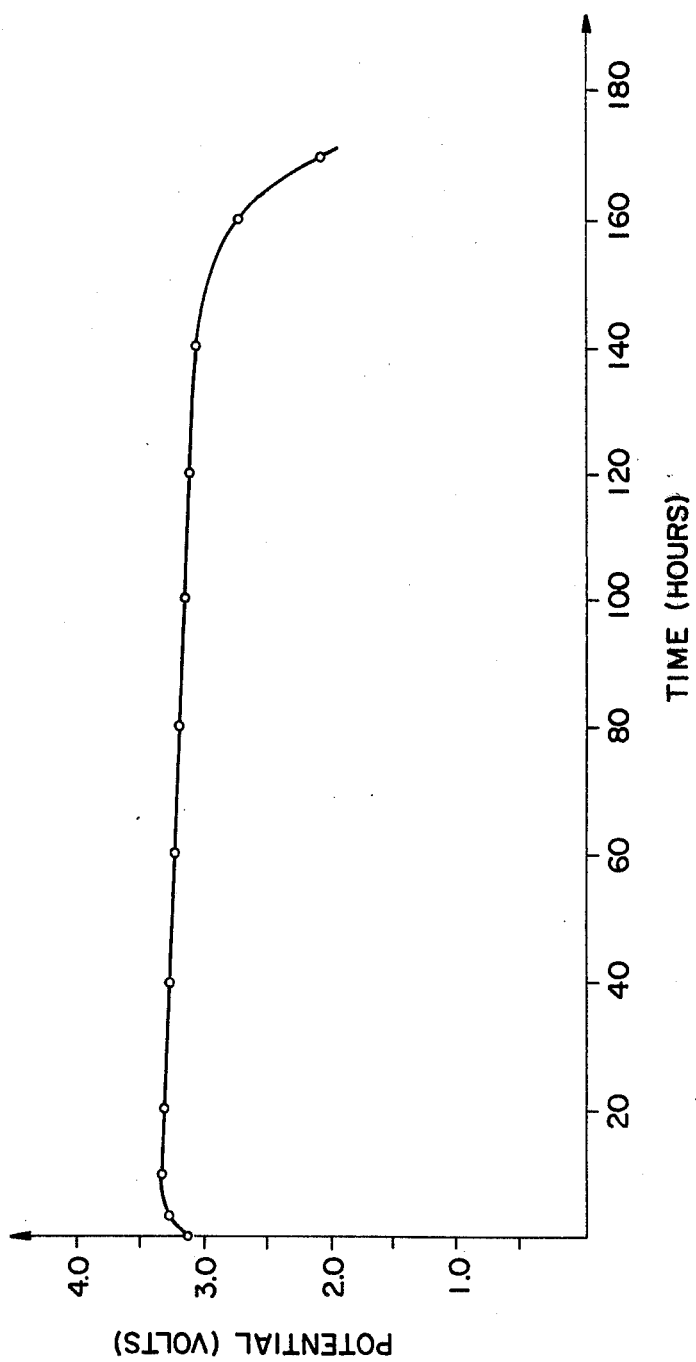

GALVANIC ELEMENT

The invention relates to a galvanic element having a negative electrode of a strongly electro-positive metal, a non-aqueous electrolyte and a positive electrode containing silver compounds.

Primary elements with non-aqueous electrolyte and positive electrodes of silver compounds are known, for example, from German Offenlegungsschrift Pat. No. 2,154,092 and U.S. Pat. No. 3,445,290. There, electrical cells are described having a negative lithium electrode and a positive silver chromate electrode, as well as cells with a light metal electrode and a positive electrode of silver thiocyanate.

One disadvantage of such positive electrodes is that silver chromate electrodes exhibit a large voltage drop during high loads and silver thiocyanate electrodes lead to the formation of soluble complex compounds which increase the internal discharge.

Accordingly, it is an object of the invention to provide a galvanic primary element which delivers a high yield of electrical energy.

It is another object to provide such an element which can be heavily loaded.

It is still another object to provide such an element which exhibits high energy density.

These objects, and others which will appear are achieved in accordance with the present invention by making the electro-chemically reducible component of the positive electrode mass of silver carbonate.

For further details, reference is made to the discussion which follows and to the accompanying drawing wherein the single FIGURE shows an operating curve of a typical element embodying the invention.

By using silver carbonate, a variety of significant advantages are obtained. Thus, a cell having a positive silver carbonate electrode and, for example, a negative lithium electrode, has high discharge potential and high energy density relative to its volume. The silver carbonate electrode is capable of being heavily loaded and to be discharged at high current density. Because of the high discharge potential of the lithium/silver carbonate system, which is about double that of the conventional Leclanche cells, this primary element is suitable for assembly into batteries having higher potentials which are interchangeable without difficulty with conventional batteries. For example, it is possible to build a 9 volt battery, for which six cells embodying the conventional Leclanche system had to be used, from only three cells. An important condition for good shelf life of galvanic elements embodying the invention is low solubility of the active, positive silver carbonate in the electrolyte.

Silver carbonate has low solubility in one molar solutions of lithium perchlorate in tetrahydrofuran, propylene, carbinate, butyrolacton, dimethyl carbonate and dimethoxyethane. These electrolyte solutions also have adequate conductivity. Lithium perchlorate-containing mixtures of propylene carbonate or butyrolacton (about 40 to 80 percent by volume) with tetrahydrofuran, dimethyl carbonate or dimethoxyethane (about 20 to 60 percent by volume) have improved conductivity, but is some cases act as somewhat stronger solvents for silver carbonate. However, when such mixtures are used the yield increases.

Particularly preferred are solutions of lithium perchlorate in a solvent mixture of propylene carbonate (about 70 to 85 percent by volume) and dimethyl carbonate (about 15 to 30 percent by volume).

In addition to lithium, there may be used for the negative electrodes the metals calcium, magnesium, aluminum and zinc. However, the lithium electrode is preferred for cells having high energy density because of its high standard potential.

To produce a positive electrode, silver carbonate is mixed with small quantities (about 1 to 6 percent by weight) of a conductive medium such as graphite or carbon black and if desired (about 0.5 to 1.5 percent by weight) a binder such as polytetrafluoroethylene. This mass is compressed into an electrode tablet and inserted into a button cell container.

A mat-like material of about 1.5 millimeter thickness and made of glass or polypropylene fibers may be used as the separator. The negative electrode is made by pressing a lithium disc of suitable thickness into a piece of nickel expanded metal spot-welded inside the lid of the cell container. The electrolyte is dripped onto the positive electrode and the separator. This electrolyte may be a one molar solution of lithium perchlorate in a mixture of about 80 percent by volume of propylene carbonate and about 20 percent by volume of dimethyl carbonate. The cell is then closed in the usual manner.

Cells embodying the invention have open circuit potentials of 3.6 volts and average discharge potentials of 3.2 volts. A discharge curve for a cell loaded at 1 $mA/cm^2$ is shown in the drawing. At the beginning of discharge the voltage is about 3.1 to 3.5 volts depending on the current load. During discharge about 95 percent by weight of the positive mass is used in the discharge process. The energy density of these cells exceeds 700 watt hours per liter.

I claim:

1. A galvanic element having a negative electrode of a strongly electro-positive metal, a non-aqueous electrolyte, and a positive electrode containing silver compounds, characterized in that
    the electro-chemically reducible component of the positive electrode mass includes silver carbonate.

2. The element of claim 1 further characterized in that the electrolyte is a solution of lithium perchlorate in a mixture of about 70 to 85 percent by volume of propylene carbonate and about 15 to 30 percent by volume of dimethyl carbonate.

3. The element of claim 1 further characterized in that the positive electrode mass includes a mixture of about 1 to 6 percent by weight of graphite and about 0.5 to 1.5 percent by weight of a binder, preferably polytetrafluoroethylene.

4. The element of claim 1 further characterized in that the electrolyte is a solution of lithium perchlorate in a mixture of about 40 to 80 percent by volume of propylene carbonate or butyrolacton with about 20 to 60 percent by volume of dimethyl carbonate or dimethoxyethane.

5. The element of claim 1 further characterized in that the negative electrode is of lithium, calcium, magnesium, aluminum, or zinc.

6. The element of claim 1 further characterized in that the negative electrode is of lithium.

7. A battery assembled of a plurality of the galvanic elements of claim 1.

8. The battery of claim 7 which is an assembly of three of the galvanic elements and has an output potential of approximately 9 volts.

9. The element of claim 1 which has an output potential of about 3 volts.

* * * * *